United States Patent
Hojo et al.

(10) Patent No.: US 8,530,086 B2
(45) Date of Patent: Sep. 10, 2013

(54) NON-AQUEOUS ELECTROLYTE SECONDARY BATTERY

(75) Inventors: Nobuhiko Hojo, Osaka (JP); Yu Otsuka, Osaka (JP); Hiroshi Yoshizawa, Osaka (JP)

(73) Assignee: Panasonic Corporation, Osaka (JP)

( * ) Notice: Subject to any disclaimer, the term of this patent is extended or adjusted under 35 U.S.C. 154(b) by 0 days.

(21) Appl. No.: 13/393,462

(22) PCT Filed: Jun. 30, 2011

(86) PCT No.: PCT/JP2011/003767
§ 371 (c)(1),
(2), (4) Date: Feb. 29, 2012

(87) PCT Pub. No.: WO2012/001988
PCT Pub. Date: Jan. 5, 2012

(65) Prior Publication Data
US 2012/0156555 A1 Jun. 21, 2012

(30) Foreign Application Priority Data

Jul. 1, 2010 (JP) .................. 2010-151359

(51) Int. Cl.
*H01M 4/60* (2006.01)
*H01M 4/36* (2006.01)
*H01M 4/48* (2010.01)
*H01M 4/52* (2010.01)

(52) U.S. Cl.
USPC ............. 429/213; 429/231.1; 429/231.5

(58) Field of Classification Search
None
See application file for complete search history.

(56) References Cited

U.S. PATENT DOCUMENTS

| 7,282,298 | B2 | 10/2007 | Inatomi et al. | |
| 7,838,150 | B2 | 11/2010 | Kinoshita et al. | |
| 7,939,206 | B2 * | 5/2011 | Otsuki et al. | 429/326 |
| 2004/0045818 | A1 | 3/2004 | Inatomi et al. | |
| 2005/0008934 | A1 * | 1/2005 | Oyama et al. | 429/213 |
| 2011/0086267 | A1 | 4/2011 | Yamamoto et al. | |
| 2011/0091767 | A1 | 4/2011 | Hojo et al. | |

FOREIGN PATENT DOCUMENTS

| JP | 01172382 A | 7/1989 |
| JP | 05-159773 | 6/1993 |
| JP | 08-195199 | * 7/1996 |
| JP | 2002-260634 | 9/2002 |

(Continued)

OTHER PUBLICATIONS

International Search Report issued in International Patent Application No. PCT/JP2011/003767, mailed Sep. 20, 2011.

(Continued)

*Primary Examiner* — John S Maples
(74) *Attorney, Agent, or Firm* — McDermott Will & Emery LLP

(57) ABSTRACT

The present invention provides a non-aqueous electrolyte secondary battery including: a positive electrode including a first active material capable of occluding and releasing a lithium ion and a second active material capable of occluding and releasing an anion; a negative electrode including a negative electrode active material capable of occluding and releasing a lithium ion; and an electrolyte containing a salt of a lithium ion and the anion. The second active material is a polymer having a tetrachalcogenofulvalene skeleton in a repeating unit. According to the present invention, provided is a non-aqueous electrolyte secondary battery with improved output characteristics, in particular, a pulse discharge characteristic, without a significant decrease in energy density.

13 Claims, 2 Drawing Sheets

(56) References Cited

FOREIGN PATENT DOCUMENTS

| | | |
|---|---|---|
| JP | 2003-077458 | 3/2003 |
| JP | 2003-092104 | 3/2003 |
| JP | 2004-111374 | 4/2004 |
| JP | 2008-034215 | 2/2008 |
| JP | 2009-277432 | 11/2009 |
| JP | 2009-295397 | 12/2009 |
| JP | 2010-053358 | 3/2010 |
| JP | 2010-129279 | 6/2010 |
| JP | 4633863 | 11/2010 |
| JP | 2010-277701 | 12/2010 |
| WO | WO 02/41420 A1 | 5/2002 |

OTHER PUBLICATIONS

Extended European Search Report issued in corresponding European Appl. No. 11800458.9 on Jul. 4, 2013.

* cited by examiner

NON-AQUEOUS ELECTROLYTE SECONDARY BATTERY

RELATED APPLICATIONS

This application is the U.S. National Phase under 35 U.S.C. §371 of International Application No. PCT/JP2011/003767, filed on Jun. 30, 2011, which in turn claims the benefit of Japanese Application No. 2010-151359, filed on Jul. 1, 2010, the disclosures of which Applications are incorporated by reference herein.

TECHNICAL FIELD

The present invention relates to a non-aqueous electrolyte secondary battery.

BACKGROUND ART

In recent years, portable electronic devices such as portable audio devices, mobile phones, and laptop computers have been widely used. From the viewpoint of energy saving or reduction of carbon dioxide emission, hybrid electric vehicles employing an internal combustion engine together with a driving force generated by electricity are becoming popular. With the spread of these devices and vehicles, there has been an increased demand for higher performance electricity storage devices used as electric power sources. A lot of research and development has been done particularly on non-aqueous electrolyte secondary batteries typified by lithium secondary batteries. Lithium secondary batteries are characterized by high voltages of 3 V or more and high energy densities. Lithium secondary batteries are required to have improved output characteristics, in particular, a pulse discharge characteristic that is an instantaneous high current characteristic, with their characteristic high energy densities being maintained.

In order to improve the output characteristics without a significant decrease in the energy densities, an approach of adding activated carbon to a positive electrode has been proposed (for example, see Patent Literatures 1 to 5). Activated carbon has an electric double layer capacitance formed by adsorption or desorption of anions or cations on its surface. Since charging of an electric double layer capacitance and discharging therefrom are rapid, the addition of activated carbon to a positive electrode may achieve both a high energy density and a high output power.

However, activated carbon has a very large surface area and the surface is very active. Therefore, while a lithium secondary battery including a positive electrode containing activated carbon is kept charged, decomposition of an electrolyte solution tends to proceed on the surface of activated carbon.

Furthermore, activated carbon has a very high adsorption capacity for trace amounts of gas components and water in the air. Therefore, such water adsorbed on activated carbon must be removed by a process such as vacuum drying or heat treatment to use activated carbon as a positive electrode material. This removal process takes a long time. Even through this removal process, it is difficult to remove adsorbed water completely. When a positive electrode of a lithium secondary battery is fabricated using activated carbon with adsorbed water remaining on its surface, problems such as evolution of gases in the battery and deterioration in charge/discharge cycle characteristics are likely to occur as the battery repeats charging and discharging.

Patent Literature 5 discloses a positive electrode made of activated carbon coated with a pseudo-capacitance type organic capacitor material. As such a pseudo-capacitance type organic capacitor material, a conductive polymer is disclosed.

However, since the capacitor of Patent Literature 5 uses activated carbon, it has the above problems. Furthermore, since conjugated electrons spread throughout the molecules of the conductive polymer that is proposed as a pseudo-capacitance type organic capacitor material, fewer electrons can be extracted therefrom. Therefore, such a polymer is not effective enough to improve the output characteristics.

Patent Literature 6 proposes a use of a carbon material capable of occluding anions in place of a part of a conductive material to increase the capacity. In this case, the carbon material capable of occluding anions contributes to the charge/discharge reactions and thus the capacity can be increased, but no improvement in the output characteristics of the resulting lithium secondary battery can be expected.

Patent Literature 7 discloses a secondary battery including an active material layer containing a lithium composite oxide and a radical compound, with different concentrations of the radical compound on the electrode surface side and the current collector side. However, since the radical compound in the active material layer is present disproportionately on the electrode surface side or the current collector side, it can contribute to a high output power only during either charging or discharging. Moreover, two or more coating solutions with different concentrations of the radical compound must be applied sequentially to the current collector to obtain such an active material layer, which makes it difficult to produce the secondary battery efficiently. Furthermore, Patent Literature 7 gives no detail description of the radical compound. Rather, it also gives compounds with different reaction potentials and different charge/discharge reaction mechanisms as specific examples of the radical compound. Therefore, the use of certain radical compounds or the use of such radical compounds in certain combinations with the lithium composite oxide results in insufficient output characteristics.

CITATION LIST

Patent Literature

Patent Literature 1 JP 2002-260634 A
Patent Literature 2 JP 2003-77458 A
Patent Literature 3 WO 02/041420 A1
Patent Literature 4 JP 2008-34215 A
Patent Literature 5 JP 2003-92104 A
Patent Literature 6 JP 05(1993)-159773 A
Patent Literature 7 JP 2009-277432 A

SUMMARY OF INVENTION

Technical Problem

As described above, attempts to improve the output characteristics of lithium secondary batteries have been made by using an active material as a secondary component in combination with an active material capable of occluding and releasing lithium ions, but the findings of the best secondary active material have not yet been fully confirmed.

The present invention has been made in view of these problems, and it is an object of the present invention to provide a non-aqueous electrolyte secondary battery with improved output characteristics, in particular, a pulse discharge characteristic, without a significant decrease in energy density.

Solution to Problem

The present invention provides a non-aqueous electrolyte secondary battery including: a positive electrode including a first active material capable of occluding and releasing a lithium ion and a second active material capable of occluding and releasing an anion; a negative electrode including a negative electrode active material capable of occluding and releasing a lithium ion; and an electrolyte containing a salt of a lithium ion and the anion. The second active material is a polymer having a tetrachalcogenofulvalene skeleton in a repeating unit.

Advantageous Effects of Invention

In the present invention, two different active materials, i.e., the first active material and the second active material, are used in the positive electrode. With the use of a material capable of occluding and releasing a lithium ion as the first active material, a sufficiently high energy density can be obtained. In addition, as the second active material, a polymer capable of occluding and releasing an anion contained in the electrolyte is used. Since the polymer has a tetrachalcogenofulvalene skeleton in the repeating unit, it contributes to an improvement in the pulse discharge characteristic. As described above, the present invention can provide a non-aqueous electrolyte secondary battery with improved output characteristics, in particular, a pulse discharge characteristic, without a significant decrease in the energy density. Furthermore, the second active material of the present invention has a lower water adsorption capacity than activated carbon. Therefore, the water content of the battery can be reduced.

DESCRIPTION OF EMBODIMENTS

Figure 1:
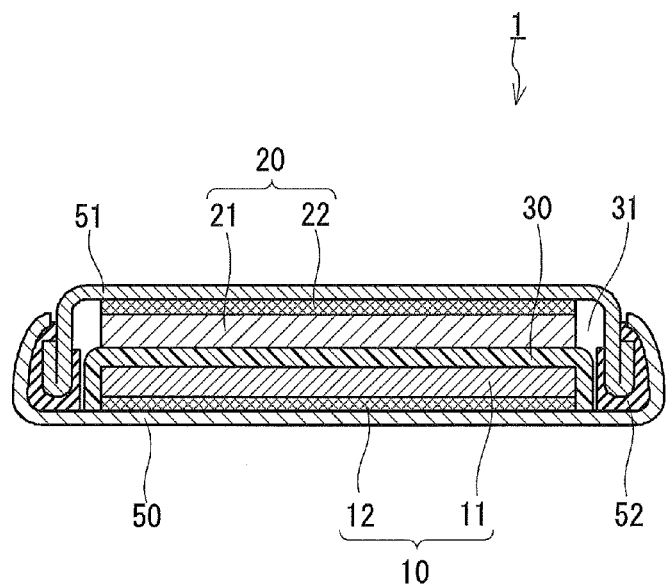
FIG. 1 is a schematic cross-sectional view of a coin-type battery as one embodiment of a non-aqueous electrolyte secondary battery of the present invention.

Hereinafter, an embodiment of a non-aqueous electrolyte secondary battery of the present invention is described. FIG. 1 shows a schematic cross-section of a coin-type electricity storage device 1 as one embodiment of the non-aqueous electrolyte secondary battery of the present invention. This electricity storage device 1 includes a coin-shaped case 50, a sealing plate 51, and a gasket 52 to form a closed structure. In the electricity storage device 1, a positive electrode 10 including a positive electrode active material layer 11 and a positive electrode current collector 12, a negative electrode 20 including a negative electrode active material layer 21 and a negative electrode current collector 22, and a separator 30 are placed. The positive electrode 10 and the negative electrode 20 are arranged so that they face each other with the separator 30 interposed therebetween and that the positive electrode active material layer 11 and the negative electrode active material layer 21 are placed in contact with the separator 30. An electrode group consisting of the positive electrode 10, the negative electrode 20 and the separator 30 is impregnated with an electrolyte solution 31.

The positive electrode active material layer 11 contains two or more active materials as positive electrode active materials. One of the two or more active materials is the first active material that is a positive electrode active material capable of occluding and releasing a lithium ion. The other one of the two or more active materials is the second active material that is an organic active material capable of occluding and releasing an anion. The organic active material capable of occluding and releasing an anion, that is, the second active material, is a polymer having a tetrachalcogenofulvalene skeleton in the repeating unit. The first active material and the second active material are uniformly distributed in the positive electrode active material layer 11. The electrolyte solution 31 contains an electrolyte containing a salt of a lithium ion and the anion. The phrase "uniformly distributed" means that the concentration (by weight) of the first active material and the concentration (by weight) of the second active material are almost constant throughout the positive electrode active material layer 11.

According to the non-aqueous electrolyte secondary battery of the present invention, a high capacity and a high output power (excellent pulse discharge characteristic) can be achieved for the following three reasons.

The first reason is the material properties of each of the two active materials contained in the positive electrode. One of the two active materials contained in the positive electrode is a positive electrode active material (first active material) capable of occluding and releasing a lithium ion. The first active material is a main active material in the positive electrode. The term "a main active material" refers to an active material whose electricity storage capacity is 50% or more of the total electricity storage capacity of the non-aqueous electrolyte secondary battery. During charging and discharging, lithium ions move between the first active material and the negative electrode, which achieves a high voltage of the order of 3 V and a high capacity. On the other hand, the other one of the two active materials contained in the positive electrode is an organic active material (second active material) capable of occluding and releasing an anion. The second active material is a polymer having a tetrachalcogenofulvalene skeleton in the repeating unit. Since the polymer having a tetrachalcogenofulvalene skeleton in the repeating unit undergoes an oxidation-reduction reaction at a potential of about 3 to 4 V with respect to lithium, it is suitable as an active material for a positive electrode. Moreover, the reaction of the polymer to occlude and release anions proceeds more rapidly than the reaction of the first active material to occlude and release lithium ions. Therefore, the polymer can contribute to a high output power, in particular, an excellent pulse discharge characteristic. Furthermore, since the polymer has a greater capacity than activated carbon, the use of this polymer results in a higher capacity than the use of activated carbon instead. Therefore, the second active material can contribute to both of a high capacity and a high output power.

The second reason is the synergistic effect of a combined use of the two active materials. An important point here is that a reactant ion for the first active material and a reactant ion for the second active material are different from each other. Since the first active material can occlude and release a lithium ion, the reactant ion for the first active material is a lithium ion. On the other hand, the second active material is a polymer having a tetrachalcogenofulvalence skeleton in the repeating unit and can occlude and release an anion, the reactant ion for the second active material is an anion. Since the reactant ion for one active material is different from that for the other active material, the reactions of these active materials each proceed smoothly and independently.

When a high output power is not required, that is, when charge/discharge is performed at a relatively low rate, even an active material with a low reaction rate can react sufficiently. Therefore, the active material that contributes to the charge/discharge does not depend on the reaction rate of the material itself. This means that one of the active materials does not react preferentially to the other, and as a result, the first active material, a main active material, mainly contributes to the charge/discharge. In other words, the key contributor to the charge/discharge is the reaction between the first active material and lithium ions. In this reaction, anions remain in the electrolyte almost without moving between the positive and negative electrodes, while lithium ions mainly move between the positive and negative electrodes.

On the other hand, when a high output power is required, that is, when charge/discharge is performed at a relatively high rate, both the first and second active materials are involved in the charge/discharge. In other words, the reaction between the second active material and anions proceeds in addition to the reaction between the first active material and lithium ions. In this case, both the lithium ions and the anions move between the positive and negative electrodes. Specifically, in the discharge process, the lithium ions move from the negative electrode to the positive electrode, while the anions move from the positive electrode to the negative electrode. Generally, the moving speed (mobility) of anions in an electrolyte is equal to or higher than that of lithium ions. The addition of anions as reactant ions increases the concentration of reactant ions to about twice that without the anions, which produces a high current and achieves a high output power.

As a comparison with the above description, for example, a case is described in which two active materials A and B both capable of occluding and releasing lithium ions are used for a positive electrode. It is assumed that the active material B undergoes a charge/discharge reaction at a higher rate than the active material A. In this case, the reactant ions are lithium ions for both the active material A and the active material B. Therefore, when charge/discharge is performed, the reaction between the active material B and lithium ions proceeds rapidly and consumes the lithium ions. As a result, the reaction of the active material A is suppressed. In addition, since the reactant ions are only lithium ions, the output characteristics are limited by the moving speed of lithium ions in the electrolyte. Therefore, even if the active material B that shares the reactant ions with the active material A is added to the active material A, the synergistic effect of a combination of these active materials A and B cannot be maximized.

Conventionally, the addition of activated carbon as a secondary active material component to an active material capable of occluding and releasing lithium ions has been proposed. However, since the reactant ions for activated carbon are both lithium ions and anions, activated carbon reacts with anions at a higher potential than its natural potential and with lithium ions at a lower potential than the natural potential. Therefore, the effect of the addition of activated carbon to improve the output characteristics varies from potential to potential. The effect may be obtained at a certain potential or higher, or it may not be obtained sufficiently at a certain potential or lower, which means that the addition of activated carbon is technically limited.

The third reason is that a combined use of the two active materials, i.e., the first and second active materials, has no adverse effect. When activated carbon as a secondary active material component is added to an active material capable of occluding and releasing lithium ions, as in the above conventional art, the resulting positive electrode has various adverse effects. That is, since the surface of activated carbon is very active and highly reactive, water, organic substances in the air, etc. are readily adsorbed onto the surface of activated carbon. Therefore, it is difficult to remove them completely even if thorough vacuum drying is performed. Furthermore, the water and organic substances adsorbed on activated carbon are decomposed on the surface of the active material capable of occluding and releasing lithium ions and gases are evolved, which may cause a swelling of the battery and a decrease in the capacity, resulting in a decrease in the reliability thereof. The influence of these adverse effects is sometimes seen prominently in the results of a preservation test, a cycle test, etc. On the other hand, less water is adsorbed on the polymer (second active material) of the present invention having a tetrachalcogenofulvalene skeleton in the repeating unit. Therefore, the combined use of the active material (first active material) capable of occluding and releasing lithium ions and the polymer has no adverse factor. For this reason, with the combined use of the first active material and the second active material, a highly reliable non-aqueous electrolyte secondary battery can be obtained.

For the above-mentioned three reasons, the present invention can provide a non-aqueous electrolyte secondary battery having a high capacity and a high output power (excellent pulse discharge characteristic) and high reliability as a battery.

Furthermore, the first active material and the second active material are uniformly distributed in the positive electrode active material layer. Therefore, a non-aqueous electrolyte secondary battery that can exhibit a high capacity and a high output power during both charging and discharging is provided. Since the positive electrode active material layer can be produced by an ordinary method, for example, by mixing the first active material, the second active material, and other components to obtain a homogeneous mixture and applying the mixture to the positive electrode current collector to form the positive electrode active material layer.

Hereinafter, constituent materials that can be used for the non-aqueous electrolyte secondary battery of the present invention are described.

For the positive electrode active material (first active material) capable of occluding and releasing lithium ions, materials known as positive electrode materials for lithium ion batteries can be used. Specifically, transition metal oxides, which may contain lithium, can be used for the first active material. In other words, transition metal oxides, lithium-containing transition metal oxides, etc. can be used. Specifically, cobalt oxides, nickel oxides, manganese oxides, vanadium oxides such as vanadium pentoxide ($V_2O_5$), and mixtures of these oxides, composite oxides of these metals, etc. can be used for the first active material. Composite oxides containing lithium and a transition metal, such as lithium cobaltate ($LiCoO_2$), are most well known as positive electrode active materials. Silicates of transition metals, phosphates of transition metals such as lithium iron phosphate ($LiFePO_4$), etc. also can be used for the first active material.

As the organic active material (second active material) capable of occluding and releasing anions, a polymer having a tetrachalcogenofulvalene skeleton in the repeating unit described below is used.

Hereinafter, the polymer having a tetrachalcogenofulvalene skeleton in the repeating unit is described in detail. In this polymer, a portion having a tetrachalcogenofulvalene skeleton has a n-conjugated electron cloud and serves as an oxidation-reduction site. The structure of this portion is represented by, for example, the following Formula (1):

[Chemical Formula 1]

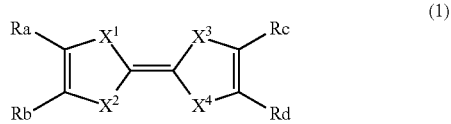
(1)

In Formula (1), $X^1$, $X^2$, $X^3$ and $X^4$ are each independently a sulfur atom, an oxygen atom, a selenium atom, or a tellurium atom. One or two selected from Ra, Rb, Rc and Rd are bonding hands for bonding with another portion of the main chain or the side chain of the polymer. The other two or three selected from Ra, Rb, Rc and Rd are each independently a chain aliphatic group, a cyclic aliphatic group, a hydrogen atom, a hydroxyl group, a cyano group, an amino group, a nitro group, a nitroso group, or an alkylthio group. The chain aliphatic group and the cyclic aliphatic group each may contain at least one selected from the group consisting of an oxygen atom, a nitrogen atom, a sulfur atom, a silicon atom, a phosphorus atom, and a boron atom. Ra and Rb may be bonded to each other to form a ring. Rc and Rd may be bonded to each other to form a ring.

When $X^1$, $X^2$, $X^3$ and $X^4$ are sulfur atoms and Ra, Rb, Rc and Rd are hydrogen atoms in Formula (1), a compound having such a structure is tetrathiafulvalene (hereinafter also abbreviated as "TTF") represented by the following Formula (2). Taking TTF as an example, a mechanism in which the portion having a tetrachalcogenofulvalene skeleton serves as an oxidation-reduction site to react with anions in an electrolyte is described below.

[Chemical Formula 2]

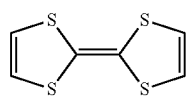
(2)

When TTF dissolved in an electrolyte solution is subjected to one-electron oxidation, one of the two five-membered rings loses an electron and TTF becomes single-positively charged, as shown in the following Formula (3). As a result, an anion as a counter ion ($PF_6^-$ in Formula (3)) is coordinated to the tetrathiafulvalene skeleton. Upon further one-electron oxidation, the other five-membered ring loses an electron and TTF becomes doubly-positively charged. As a result, another anion as a counter ion is coordinated to the tetrathiafulvalene skeleton.

[Chemical Formula 3]

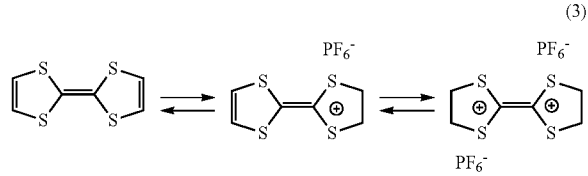
(3)

The cyclic skeleton is stable even in an oxidized state, and thus it is reduced by receiving electrons again to return to an electrically neutral state. In other words, the oxidation-reduction reaction illustrated by the above Formula (3) is reversible. The non-aqueous electrolyte secondary battery of the present invention utilizes this oxidation-reduction property of the tetrathiafulvalene skeleton.

For example, when TTF is used for the positive electrode of the electricity storage device, the tetrathiafulvalene skeleton shifts to an electrically neutral state during the discharge process. In other words, the reaction proceeds to the left in Formula (3). Conversely, during the charge process, the tetrathiafulvalene skeleton shifts to the positively charged state. That is, the reaction proceeds to the right in Formula (3).

When $X^1$, $X^2$, $X^3$ and $X^4$ are each independently a sulfur atom, a selenium atom, a tellurium atom, or an oxygen atom, and Ra, Rb, Rc and Rd are hydrogen atoms in Formula (1), compounds having such a structure are collectively referred to as tetrachalcogenofulvalene and their oxygen-containing analogs. These compounds have the same oxidation-reduction property as TTF. This is reported, for example, in "TTF Chemistry: Fundamentals and Applications of Tetrathiafulvalene", Journal of the American Chemical Society, 97:10, 1975, pp. 2921-2922, Chemical Communications, 1997, pp. 1925-1926, etc.

Compounds in which functional groups are bonded to the tetrachalcogenofulvalene skeleton, i.e., compounds having various structures of Ra, Rb, Rc and Rd in Formula (1), have the same oxidation-reduction property as tetrachalcogenofulvalene. This is reported, for example, in "TTF Chemistry: Fundamentals and Applications of Tetrathiafulvalene". The synthesis methods of these compounds are also reported therein. As just described, the important structure for a good oxidation-reduction property is the structure of the tetrachalcogenofulvalene skeleton itself. Therefore, Ra, Rb, Rc and Rd in Formula (1) are not particularly limited as long as they are the structures that do not contribute to the oxidation-reduction of the tetrachalcogenofulvalene skeleton.

The organic active material (second active material) used in the present invention is a polymer having a tetrachalcogenofulvalene structure, as illustrated in Formula (1), in the repeating unit. As the molecular weight of a molecule containing a tetrachalcogenofulvalene skeleton increases, the solubility of the molecule in an organic solvent decreases. Therefore, when an electrolyte solution contains an organic solvent, the use of a polymer having a tetrachalcogenofulvalene skeleton as the second active material makes it possible to suppress the dissolution of the second active material into the electrolytic solution and reduce the deterioration of the cycle characteristics.

It is preferable that the molecular weight of the polymer be high. Specifically, it is preferable that the polymer have, in one molecule, four or more tetrachalcogenofulvalene skeletons represented by Formula (1). That is, it is preferable that the degree of polymerization (number-average degree of polymerization) of the polymer, specifically n in the following Formula (4) or the sum of n and m in the following formula (6) be 4 or greater. An organic active material having such a molecular weight is difficult to dissolve in an organic solvent. More preferably, the degree of polymerization of the polymer is 10 or more, and still more preferably 20 or more. The upper limit of the degree of polymerization of the polymer is not particularly limited. From the viewpoints of production cost, yield, etc., the degree of polymerization of the polymer is, for example, 300 or less, and preferably 150 or less.

The tetrachalcogenofulvalene skeleton may be contained in the main chain or the side chain of the polymer. The skeleton may be contained in both the main chain and the side chain of the polymer. The structure of the polymer having the tetrachalcogenofulvalene skeleton in the main chain is represented, for example, by the following Formula (4).

[Chemical Formula 4]

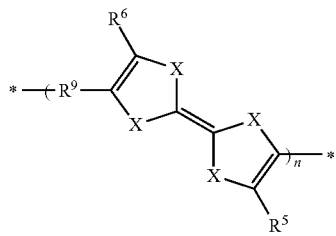

(4)

In Formula (4), X is an oxygen atom, a sulfur atom, a selenium atom, or a tellurium atom. $R^5$ and $R^6$ are each independently a chain saturated hydrocarbon group, a chain unsaturated hydrocarbon group, a cyclic saturated hydrocarbon group, a cyclic unsaturated hydrocarbon group, a phenyl group, a hydrogen atom, a hydroxyl group, a cyano group, an amino group, a nitro group or a nitroso group. The chain saturated hydrocarbon group, the chain unsaturated hydrocarbon group, the cyclic saturated hydrocarbon group and the cyclic unsaturated hydrocarbon group each may contain at least one selected from the group consisting of an oxygen atom, a nitrogen atom, a sulfur atom and a silicon atom. $R^9$ is a linker, which is typically a chain unsaturated hydrocarbon group or a cyclic unsaturated hydrocarbon group containing at least one of an acetylene skeleton and a thiophene skeleton, and may contain at least one selected from the group consisting of an oxygen atom, a nitrogen atom, a sulfur atom, and a silicon atom. n is an integer representing the number of repeating monomer units.

Formula (4) is an alternating copolymer in which repeating units each containing a tetrachalcogenofulvalene skeleton and repeating units each not containing a tetrachalcogenofulvalene skeleton ($R^9$ in Formula (4)) are alternately arranged. The bonding order is not particularly limited to this. That is, the polymer having, in the main chain, a repeating unit containing a tetrachalcogenofulvalene skeleton and a repeating unit not containing a tetrachalcogenofulvalene skeleton may be any one of a block copolymer, an alternating copolymer, and a random copolymer. If the polymer is a block copolymer, it has a structure in which units each composed of a series of directly bonded repeating units each containing a tetrachalcogenofulvalene skeleton and units each composed of a series of directly bonded repeating units each not containing a tetrachalcogenofulvalene skeleton are alternately arranged. If the polymer is a random copolymer, it has a structure in which repeating units each containing a tetrachalcogenofulvalene skeleton and repeating units each not containing a tetrachalcogenofulvalene skeleton are randomly arranged.

For example, when X is a sulfur atom, $R^5$ and $R^6$ are each a phenyl group, and $R^9$ is a diethynylbenzene group in Formula (4), a polymer having such a structure is represented by a structural formula shown in Formula (5). The polymer represented by Formula (5) is an alternating copolymer of 4,4'-diphenyltetrathiafulvalene and 1,3-diethynylbenzene. In Formula (5), n is an integer representing the number of repeating monomer units.

[Chemical Formula 5]

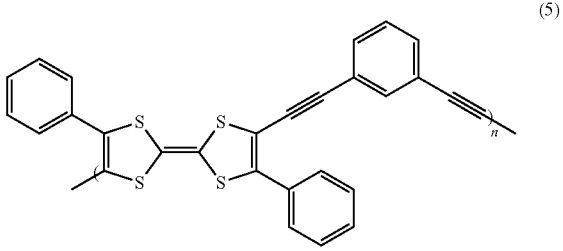

(5)

If the polymer has a tetrachalcogenofulvalene skeleton in the side chain, the polymer is represented, for example, by a structure in which two repeating units are bonded to each other at *, as shown in the following Formula (6). The bonding order of the two repeating units is not particularly limited, as in the above description.

[Chemical Formula 6]

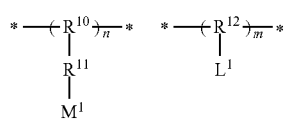

(6)

In Formula (6), $R^{10}$ and $R^{12}$ are trivalent groups that constitute the main chain of the polymer. They contain each independently: at least one selected from the group consisting of a carbon atom, an oxygen atom, a nitrogen atom, and a sulfur atom; and at least one substituent selected from the group consisting of a saturated aliphatic group having 1 to 10 carbon atoms and an unsaturated aliphatic group having 2 to 10 carbon atoms, or at least one hydrogen atom. $L^1$ bonded to $R^{12}$ is a monovalent group containing an ester group, an ether group, a carbonyl group, a cyano group, a nitro group, a nitroxyl group, an alkyl group, a phenyl group, an alkylthio group, a sulfone group, or a sulfoxide group. $R^{11}$ is a divalent group bonded to $R^{10}$ and $M^1$, and contains at least one selected from the group consisting of alkylene having 1 to 4 carbon atoms, alkenylene having 1 to 4 carbon atoms, arylene, ester, amide, and ether. $R^{11}$ may have a substituent. $M^1$ bonded to $R^{11}$ is a monovalent group that can be represented by Formula (1). n and m are integers each representing the number of repeating monomer units.

For example, when X is a sulfur atom, the resulting polymer has a structure shown in the following Formula (7).

[Chemical Formula 7]

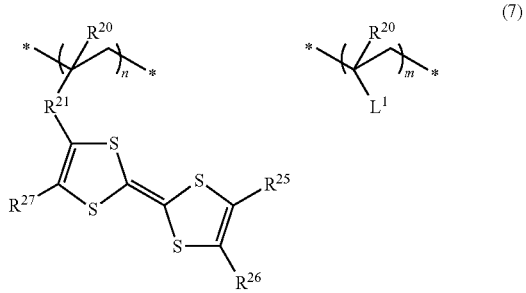

(7)

In Formula (7), $R^{21}$ is a divalent group, and contains at least one selected from the group consisting of: substituted or unsubstituted alkylene having 1 to 4 carbon atoms; substituted or unsubstituted alkenylene having 1 to 4 carbon atoms; substituted or unsubstituted arylene; ester; amide; and ether. $R^{20}$ and $R^{22}$ are each independently a saturated aliphatic group having 1 to 4 carbon atoms, a phenyl group, or a hydrogen atom. $R^{25}$, $R^{26}$ and $R^{27}$ are each independently a chain aliphatic group, a cyclic aliphatic group, a hydrogen atom, a hydroxyl group, a cyano group, an amino group, a nitro group, a nitroso group, or an alkylthio group. $R^{25}$ and $R^{26}$ may be bonded to each other to form a ring. $L^1$ is a monovalent group containing an ester group, an ether group, a carbonyl group, a cyano group, a nitro group, a nitroxyl group, an alkyl group, a phenyl group, an alkylthio group, a sulfone group, or a sulfoxide group. n and m are integers each representing the number of repeating monomer units.

For example, when $L^1$ is a monovalent group containing an ester group, $R^{21}$ is a divalent ester group, $R^{20}$ and $R^{22}$ are each a methyl group, and $R^{25}$, $R^{26}$ and $R^{27}$ are each a hydrogen atom, the resulting polymer has a structure represented by the following Formula (8). In Formula (8), n and m are integers each representing the number of repeating monomer units.

[Chemical Formula 8]

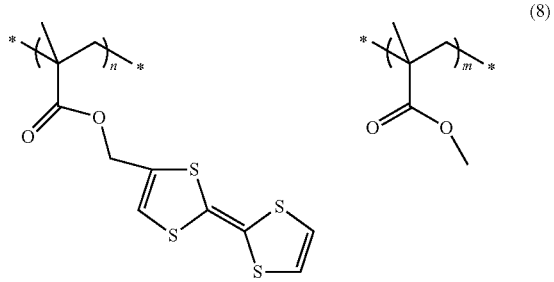

(8)

Preferably, the above-listed polymers each having a tetrachalcogenofulvalene skeleton in the repeating unit have no hydrophilic group. Thereby, the water content of the battery can be reduced.

It is preferable that the non-aqueous electrolyte secondary battery of the present invention have a potential region, i.e., an overlapping potential region, where a potential range in which the first active material can occlude and release lithium ions and a potential region in which the second active material can occlude and release anions overlap each other. When the non-aqueous electrolyte secondary battery has an overlapping potential region, both the first active material and the second active material can react simultaneously in the overlapping potential region. Therefore, the synergistic effect of a combined use of the first active material and the second active material can be increased, resulting in an increase in the effect of increasing the output power. The overlapping potential region is described below with reference to FIGS. 2 to 4.

Figure 2:
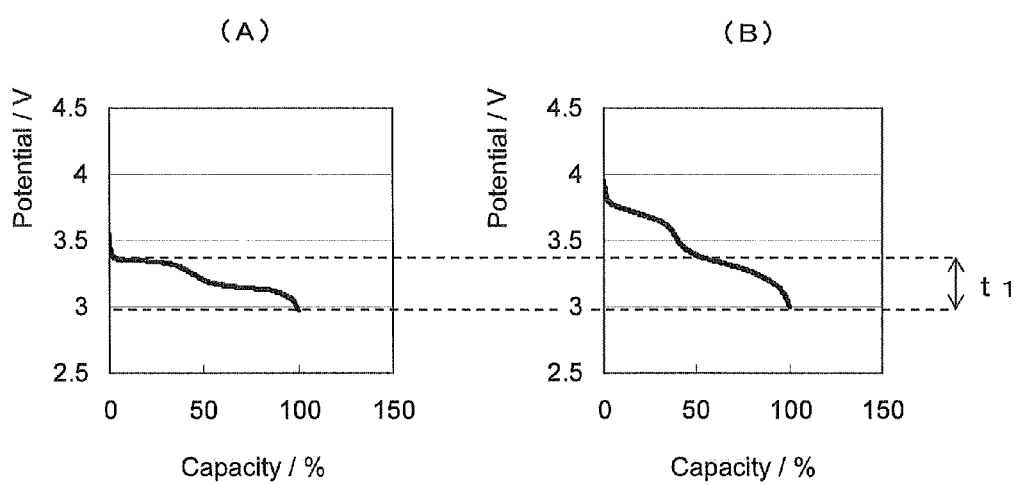
FIG. 2 is a comparison diagram showing charge/discharge curves of two active materials in a positive electrode, the curves showing an overlapping potential region.

FIG. 2 shows a charge/discharge curve obtained by using the first active material alone and a charge/discharge curve obtained by using the second active material alone, the curves showing an overlapping potential region. The left graph (A) of FIG. 2 shows a charge/discharge curve of an electricity storage device obtained by using the first active material alone as a positive electrode active material. The right graph (B) of FIG. 2 shows a charge/discharge curve of an electricity storage device obtained by using the second active material alone as a positive electrode active material. According to the graph (A) of FIG. 2, the first active material can occlude and release lithium ions in a potential range of 3.0 to 3.4 V. According to the graph (B) of FIG. 2, the second active material can occlude and release anions in a potential range of 3.0 to 3.8 V. Therefore, these potential ranges overlap each other in a potential region of 3.0 to 3.4 V. That is, the overlapping potential region is 3.0 to 3.4 V (i.e., t1 in FIG. 2). When both the first active material and the second active material are used as positive electrode active materials, these active materials can contribute to charge/discharge simultaneously in the overlapping potential region t1. As a result, the effect of maximizing the output power can be obtained.

Radical compounds having a nitroxyl radical structure in a molecule, such as PTMA, disclosed in Patent Literature 7 have only an oxidation-reduction potential of about 3.6 V (potential plateau) with respect to lithium. Therefore, these radical compounds are materials that are difficult to provide a wide overlapping potential region when they are used with the first active material. For this reason, only limited types of materials can be selected suitably for the first active material.

Figure 3:
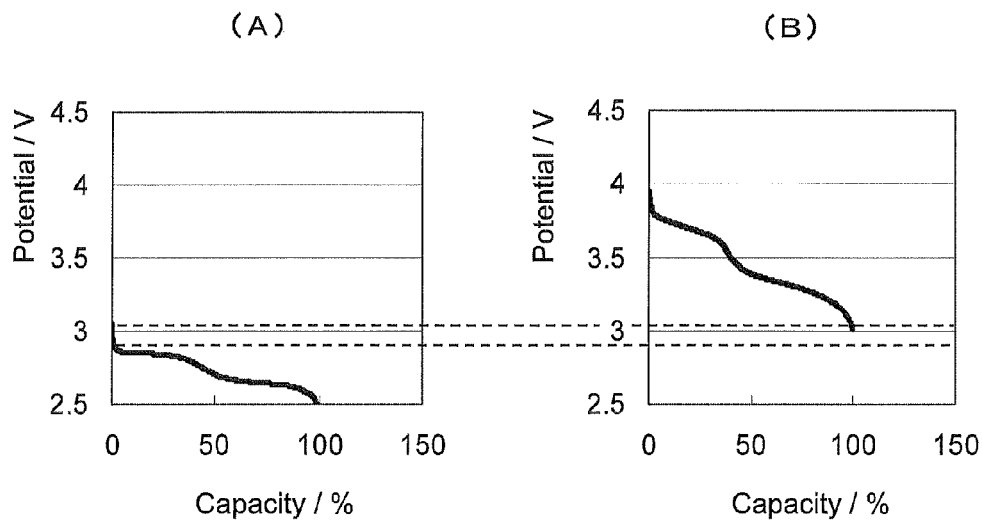
FIG. 3 is a comparison diagram showing charge/discharge curves of two active materials in a positive electrode, the curves showing no overlapping potential region.
Figure 4:
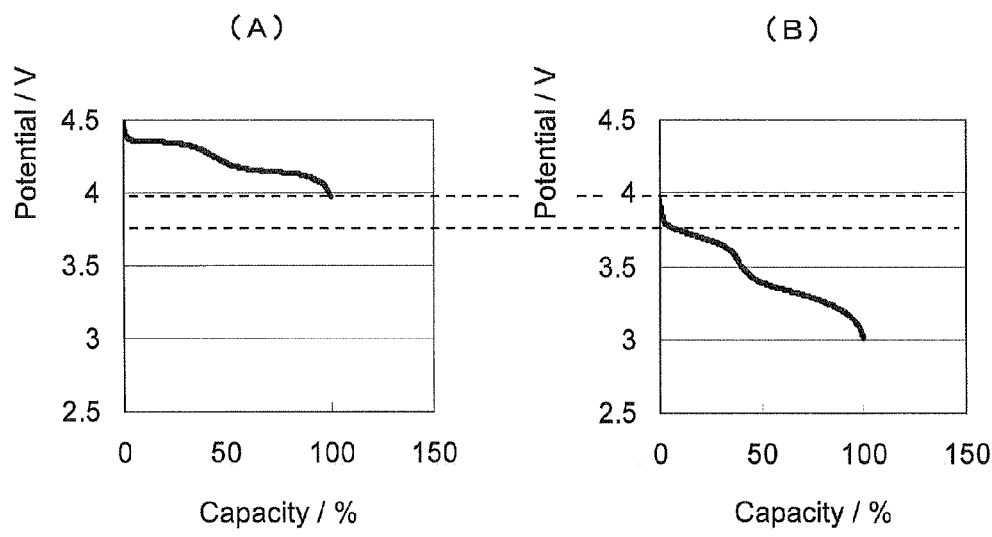
FIG. 4 is a comparison diagram showing other charge/discharge curves of two active materials in a positive electrode, the curves showing no overlapping potential region.

On the other hand, FIGS. 3 and 4 each show a charge/discharge curve obtained by using the first active material alone and a charge/discharge curve obtained by using the second active material alone, the curves showing no overlapping potential region. The left graph (A) of each of FIGS. 3 and 4 shows a charge/discharge curve obtained by using the first active material alone as a positive electrode active material. The left graph (A) of each of FIGS. 3 and 4 shows a charge/discharge curve obtained by using the second active material alone as a positive electrode active material. In FIG. 3, the second active material can occlude and release anions in a potential range of 3.0 to 3.8 V, which is higher than a potential range of 2.5 to 2.8 V where the first active material can occlude and release lithium ions. Therefore, these two potential ranges have no overlapping potential region. In FIG. 4, the second active material can occlude and release anions in a potential range of 3.0 to 3.8 V, which is lower than a potential range of 4.0 to 4.4 V where the first active material can occlude and release lithium ions. Therefore, these two potential ranges have no overlapping potential region.

In the present invention, the case of FIG. 2 is more preferable than the cases of FIGS. 3 and 4. Therefore, it is preferable to select a combination of the first active material and the second active material having an overlapping potential region where they can react simultaneously. According to FIG. 2, the overlapping potential region has a size (width) of 0.4 V because it is observed in the range of 3.0 to 3.4 V. Preferably, the materials selected as the first active material and the second active material have a wide overlapping potential region. Specifically, the size of the overlapping potential region is preferably 0.05 V or more, and more preferably 0.1 V or more. There is no upper limit on the overlapping potential region, but the size of the overlapping potential region is preferably not more than 1 V, and more preferably not more than 0.5 V. A combined use of such materials as the first active material and the second active material of the positive electrode maximizes the synergistic effect of these active materials.

The polymer having a tetrachalcogenofulvalene skeleton in the repeating unit, i.e., the second active material, can occlude and release anions in a range of about 3 to 4 V with respect to lithium, and in particular, has a potential plateau in a range of 3.3 to 3.8 V. Therefore, in order to obtain an overlapping potential region, it is preferable that the first active material capable of occluding and releasing lithium ions also can be oxidized/reduced in a range of about 3 to 4 V with respect to lithium, and in particular, have a potential plateau in a range of 3.3 to 3.8 V. Specifically, the lower limit of the potential range in which the first active material can occlude and release lithium ions is preferably 2.5 V, more preferably 3 V, and still more preferably 3.3 V. The upper limit thereof is preferably 4.3 V, more preferably 4 V, and still more preferably 3.8 V.

From the viewpoint of reduction potentials, it is preferable that the non-aqueous electrolyte secondary battery satisfies the condition that at least one reduction potential of the first active material is higher than at least one reduction potential of the second active material. The second active material is a polymer having a tetrachalcogenofulvalene skeleton in the repeating unit, and an active material that can contribute significantly to a high output power. In order to make the best use of the properties of the second active material, it is preferable that the second active material be not consumed before discharge must be performed at a relatively high rate. That is, it is preferable that the first active material be mainly involved in discharge if it is a normal discharge. This allows the second active material to be involved in discharge when a high rate discharge must be performed, which contributes greatly to a high power output.

For example, the first active material can have a higher reduction potential than the highest reduction potential of the second active material. In this case, the difference between the highest reduction potential of the second active material and the reduction potential of the first active material, which is higher than the highest reduction potential, is 0.05 to 0.5 V, for example. When this difference is too large, no overlapping potential region described above may be obtained.

From the viewpoint of reduction potentials, in order to ensure the overlapping potential region, it is preferable that the second active material have a first reduction potential that is higher than at least one reduction potential of the first active material and a second reduction potential that is lower than the at least one reduction potential of the first active material. The polymer having a tetrachalcogenofulvalene skeleton in the repeating unit, i.e., the second active material, has at least two reduction potentials of about 3 to 4 V with respect to lithium (more specifically, the second active material has two potential plateaus in the range of about 3.3 to 3.8 V). Therefore, in order to obtain an overlapping potential region, it is more preferable to select, as the first material, a material having a reduction potential in a range of about 3 to 4 V with respect to lithium. Furthermore, in order for the second active material to have the first reduction potential that is higher than the at least one reduction potential of the first active material and the second reduction potential that is lower than the at least one reduction potential of the first active material, it is preferable that the at least one reduction potential of the first active material be in the range of 3.3 to 3.8 V. In other words, it is preferable that the first active material have a potential plateau (i.e., a reduction potential) in the range of at least 3.3 to 3.8 V.

This effect is described below. The first active material as a main active material exhibits a high capacity, while the second active material as a secondary active material exhibits a high rate reaction. Since the reaction potentials of the first active material and the second active material have an overlapping potential region, both a high capacity and a high rate reaction can be achieved in a wide potential region. Furthermore, since the second active material has the second reduction potential that is lower than the at least one reduction potential of the first active material, when the contribution of the second active material to the discharge decreases and the potential decreases, the first active material can contribute to the discharge. This means that a high current discharge can be achieved and a high output power can be obtained. In addition, since the second active material has the first reduction potential that is higher than the at least one reduction potential of the first active material, when the contribution of the first active material to the charge decreases and the potential increases, the second active material can contribute to the charge. This means that a high current charge can be achieved and a high input power can be obtained. As described above, since the second active material has the first reduction potential that is higher than at least one reduction potential of the first active material and the second reduction potential that is lower than the at least one reduction potential of the first active material, not only a high capacity and a high output power (high current discharge) but also a high input power (high current charge) can be achieved.

Specifically, the following materials are more preferably used for the positive electrode active material (first active material) capable of occluding and releasing lithium ions. Among transition metal oxides, manganese oxides and vanadium oxides, typically vanadium pentoxide ($V_2O_5$), are more preferred. Among silicates of transition metals and phosphates of transition metals, lithium iron phosphate ($LiFePO_4$) is more preferred. Vanadium pentoxide ($V_2O_5$) has reduction potentials of about 3.2 V and about 3.4 V with respect to lithium, and lithium iron phosphate ($LiFePO_4$) has a reduction potential of about 3.4 V with respect to lithium. Lithium manganese phosphate and lithium cobaltate each have a reduction potential of about 4.1 V with respect to lithium. Lithium manganate and lithium nickelate each have a reduction potential of about 4.0 V with respect to lithium. Lithium-nickel-manganese-cobalt composite oxide ($LiNi_{1/3}Mn_{1/3}Co_{1/3}O_2$) has a reduction potential of about 3.7 V with respect to lithium.

Furthermore, in order to achieve not only a high capacity and a high output power (high current discharge) but also a high input power (high current charge), it is effective that the second active material has the first reduction potential that is higher than at least one reduction potential of the first active material and the second reduction potential that is lower than the at least one reduction potential of the first active material, as described above. In order to obtain such a combination of the first active material and the second active material, the second active material must have two or more potential plateaus. For example, a polymer having a tetrachalcogenofulvalene skeleton in the repeating unit can be used as the second active material. This polymer has two potential plateaus in the range of about 3.3 to 3.8 V, for example.

The radical compound having a nitroxyl radical structure in its molecule, such as PTMA, disclosed in Patent Literature 7 has only an oxidation-reduction potential of about 3.6 V with respect to lithium. This means that this radical compound does not have two potential plateaus but has almost one potential plateau.

On the other hand, as the first active material, an electrode active material having a potential plateau in the range of 3.3 to 3.8 V can be used. Specifically, manganese oxides, vanadium oxides, typically vanadium pentoxide ($V_2O_5$), lithium iron phosphate ($LiFePO_4$), and lithium-nickel-manganese-cobalt composite oxide ($LiNi_{1/3}Mn_{1/3}Co_{1/3}O_2$) are preferred. This is because the reduction potentials (potential plateaus) of these materials are located between the two potential plateaus of the polymer having the tetrachalcogenofulvalene skeleton in the repeating unit. Specifically, vanadium pentoxide ($V_2O_5$), lithium iron phosphate ($LiFePO_4$), lithium-nickel-manganese-cobalt composite oxide ($LiNi_{1/3}Mn_{1/3}Co_{1/3}O_2$) have potential plateaus of about 3.4 V, about 3.4 V, and about 3.7 V, respectively, with respect to lithium.

From the viewpoint of reduction potentials, it is preferable to satisfy the following conditions. The conditions are that one reduction potential of the first active material and one reduction potential of the second active material exist in the overlapping potential region, and that the one reduction potential of the first active material is higher than the one reduction potential of the second active material. When these conditions are satisfied, the effect of maximizing the output power can be obtained. The presence of the overlapping potential region allows the first active material to react during normal discharging. In addition, the satisfaction of the above conditions allows the second active material to contribute to discharge when a short-time (1 to 5 seconds or less) high current is required.

The content of the first active material in the positive electrode is preferably 50% or more, and more preferably 70% or more, in terms of the electricity storage capacity of the first active material relative to the total electricity storage capacity of the secondary battery. The content of the second active material in the positive electrode is preferably less than 50%, and more preferably less than 30%, in terms of the electricity storage capacity of the second active material relative to the total electricity storage capacity of the secondary battery. When the electricity storage capacity of the first active material is 50% or more of the total electricity storage capacity of the secondary battery, that is, the electricity storage capacity of the second active material is less than 50% of the total electricity storage capacity of the secondary battery, the resulting secondary battery can achieve both a high capacity derived from the first active material and a high output power derived from the second active material. Furthermore, when the electricity storage capacity of the first active material is 70% or more of the total electricity storage capacity of the secondary battery, that is, the electricity storage capacity of the second active material is less than 30% of the total electricity storage capacity of the secondary battery, the resulting secondary battery can achieve both a still higher capacity derived from the first active material and a high output power derived from the second active material.

When the electricity storage capacity of the first active material is less than 50% of the total electricity storage capacity of the secondary battery, that is, the electricity storage capacity of the second active material is 50% or more of the total electricity storage capacity of the secondary battery, it may be difficult to achieve a high capacity derived from the first active material, although a high output power derived from the second active material can be achieved.

The positive electrode active material layer 11 may contain a conductive agent for supporting the electron conductivity in the electrode and/or a binder for maintaining the shape of the positive electrode active material layer 11, if necessary, in addition to the first active material and the second active material. Examples of the conductive agent include carbon materials such as carbon black, graphite and carbon fibers, metal fibers, metal powders, conductive whiskers, and conductive metal oxides. Mixtures thereof also may be used. The binder may be either a thermoplastic resin or a thermosetting resin. Examples of the binder include: polyolefin resins typified by polyethylene and polypropylene; fluorine resins typified by polytetrafluoroethylene (PTFE), polyvinylidene fluoride (PVDF) and hexafluoropropylene (HFP), and copolymeric resins thereof; styrene-butadiene rubbers; and polyacrylic acids and copolymeric resins thereof. Mixtures thereof also may be used.

For the positive electrode current collector 12, materials known as positive electrode current collector materials for non-aqueous electrolyte secondary batteries can be used. The positive electrode current collector 12 is, for example, a foil or a mesh of a metal such as aluminum or stainless steel, or carbon. When a metal foil or a metal mesh is used as the positive electrode current collector 12, good electrical contact between the positive electrode current collector 12 and the case 50 can be maintained by welding them together. When the positive electrode active material layer 11 has a self-sustaining shape such as a pellet or a film, the positive electrode active material layer 11 may be configured to be in direct contact with the case 50 without using the positive electrode current collector 12.

The negative electrode active material layer 21 contains a negative electrode active material. For the negative electrode active material, known materials capable of reversibly occluding and releasing lithium ions are used. Examples of the negative electrode active material include graphite materials typified by natural graphite and artificial graphite, amorphous carbon materials, lithium metal, lithium-aluminum alloys, lithium-containing composite nitrides, lithium-containing titanium oxides, silicon, alloys containing silicon, silicon oxides, tin, alloys containing tin, and tin oxides. Mixtures thereof also may be used. For the negative electrode current collector 22, materials known as negative electrode current collector materials for non-aqueous electrolyte secondary batteries can be used. The negative electrode current collector 22 is, for example, a foil or a mesh of a metal such as copper, nickel or stainless steel. When the negative electrode active material layer 21 has a self-sustaining shape such as a pellet or a film, the negative electrode active material layer 21 may be configured to be in direct contact with the sealing plate 51 without using the negative electrode current collector 22.

The negative electrode active material layer 21 may contain a conductive agent and/or a binder, if necessary, in addition to the negative electrode active material. As the conductive agent and the binder, the same materials as those that can be used for the positive electrode active material layer 11 can be used.

The separator 30 is a resin layer composed of a resin having no electron conductivity. It is also a porous film having a high ion permeability, a predetermined mechanical strength and a predetermined electrical insulation. Preferably, the separator 30 is made of polyolefin resin such as polypropylene, polyethylene, or a combination thereof, because these materials are highly resistant to organic solvents and hydrophobic. The separator 30 may be replaced by an ion-conductive resin layer that is swollen with an electrolytic solution and serves as a gel electrolyte.

The electrolyte solution 31 contains an electrolyte containing a salt of a lithium ion and an anion. The salt of a lithium ion and an anion is not particularly limited as long as it can be used in a lithium battery. Examples of the salt include salts each of which is composed of a lithium ion and any one of the following anions. Examples of the anions include a halide anion, a perchlorate anion, a trifluoromethanesulfonate anion, a tetrafluoroborate anion ($BF_4^-$), a hexafluorophosphate anion ($PF_6^-$), a bis(trifluoromethanesulfonyl)imide anion, and a bis(perfluoroethylsulfonyDimide anion. Two or more of these salts may be used in combination as a salt of a lithium ion and an anion.

The electrolyte may contain a solid electrolyte in addition to the salt of a lithium ion and an anion. Examples of the solid electrolyte include $Li_2S$—$SiS_2$, $Li_2S$—$B_2S_5$, $Li_2S$—$P_2S_5$—$GeS_2$, sodium/alumina ($Al_2O_3$), amorphous polyether or polyether with a low phase transition temperature (Tg), amorphous vinylidene fluoride-hexafluoropropylene copolymer, and heterogeneous polymer blend polyethylene oxide.

When the electrolyte is a liquid, the electrolyte itself may be used as the electrolyte solution 31, or the electrolyte may be dissolved in a solvent to use the solution as the electrolyte solution 31. When the electrolyte is a solid, it must be dissolved in a solvent to use the solution as the electrolyte solution 31.

For the solvent for dissolving the electrolyte, known solvents that can be used for non-aqueous secondary batteries and non-aqueous electric double layer capacitors can be used. Specifically, non-aqueous solvents containing a cyclic carbonate can be suitably used because cyclic carbonates have very high dielectric constants, as typically observed in ethylene carbonate and propylene carbonate. Among cyclic carbonates, propylene carbonate is preferred because it has a freezing point of −49° C., which is lower than that of ethylene carbonate, thus allowing the electricity storage device to operate even at low temperatures.

Furthermore, non-aqueous solvents containing a cyclic ester also can be suitably used because cyclic esters have very high dielectric constants, as typically observed in y-butyrolactone.

When a non-aqueous solvent contains any of these solvents as a component thereof, the non-aqueous solvent as a whole can have a very high dielectric constant. As the non-aqueous solvent, only one of these solvents may be used, or two or more of these may be mixed for use. In addition to the above components for the non-aqueous solvent, chain carbonates, chain esters, cyclic or chain ethers can be used. Specific examples of the components include dimethyl carbonate, diethyl carbonate, methyl ethyl carbonate, dioxolane, and sulfolane.

The above-described embodiment can provide a reliable non-aqueous electrolyte secondary battery that can achieve both a high capacity and a high output power (excellent pulse discharge characteristic).

Conventionally, approaches from a structural standpoint, such as optimization of the electrode thickness and length, have been taken to increase the output power in cylindrical batteries and rectangular batteries. In contrast, the present invention takes an approach from a material standpoint to increase the output power. This means that the present invention is the most effective approach to increase the output power when the outer case of a battery is simply constructed and its shape cannot be changed, for example, it is a coin-type battery.

EXAMPLES

Hereinafter, examples of the present invention are described. The present invention is not limited to these examples.

[Synthesis of Polymer having tetrachalcogenofulvalene Skeleton in Repeating Unit]

The synthesis of a polymer having a tetrachalcogenofulvalene skeleton was performed in two steps: a step of synthesizing a precursor; and a step of synthesizing the polymer.

First, the step of synthesizing the precursor was performed. 1.43 g (24 mmol) of isopropylamine was dissolved in 16 mL of tetrahydrofuran (THF) to obtain a solution. 0.6 mL of a hexane solution of n-butyllithium (with a concentration of 2.6 mol/L), i.e., 1.56 mmol of n-butyllithium, was added dropwise to the solution at −78° C. The resulting solution was stirred for 10 minutes, and then 0.10 g (0.43 mmol) of a compound 9a in the left hand side of Formula (9), that is, dimethyltetrathiafulvalene was added at −78° C. As a result, the transparent solution turned into an ochre suspension. The suspension was further stirred for 10 minutes, and then 3.10 g (7.0 mmol) of $C_6F_{13}I$ was added at −78° C. As a result, the suspension turned into a dark green solution. Then, after being kept stirred for a while, the dark green solution turned to red. The red solution was stirred for 1 hour at −78° C., and then subjected to thin-layer chromatography (TLC). As a result, the spot derived from the starting material disappeared and a new spot was observed. The temperature of the reaction solution was slowly raised to room temperature, and stirring was continued for further 4 hours. Water was added to the reaction solution, and the resulting solution was subjected to extraction with ether to separate an ether layer. The ether solution was dried to remove water therein, and then the solvent was removed. Thus, a dark red solid was obtained. This dark red solid was subjected to column chromatography (with silica and chloroform) to obtain a dark red band, and the solvent was removed therefrom. Thus, a dark red viscous solid was obtained. Hexane was added to this viscous solid and dried. Thus, an orange powdery product was obtained. As a result of a $^1$H-NMR ($CDCL_3$) measurement and an IR measurement (KBr method), it was confirmed that this product was a compound 9b in the right hand side of Formula (9), that is, diiodo-dimethyltetrathiafulvalene. The yield was 0.14 g (67%).

[Chemical Formula 9]

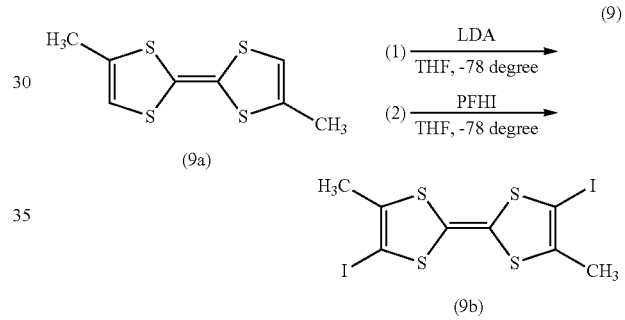

Next, the step of synthesizing the polymer was performed. 0.12 g (0.25 mmol) of the compound 9b thus obtained and 2 mL of triethylamine were dissolved in 10 mL (0.12 g, 0.25 mmol) of N-methylpyrrolidone to obtain a solution. The solution was subjected to nitrogen bubbling for 10 minutes, and then 0.060 g (0.05 mmol) of $Pd(PPh_3)_4$, 0.020 g (0.10 mmol) of CuI and 0.049 g (0.39 mmol) of 1,3-diethynylbenzene were added and stirred at 100° C. The color of the solution changed from dark red to dark red-orange. This mixed solution was stirred at 100° C. for 24 hours. Then, the reaction solution was put into water, and a black-red solid was obtained. This solid was washed with methanol and then acetone with stirring, then isolated by a Kiriyama funnel, and naturally dried. Thus, a dark brown product was obtained. As a result of a $^1$H-NMR ($CDCL_3$) measurement and an IR measurement (KBr method), it was confirmed that this product was a compound 10b in the right hand side of Formula (10), that is, a poly(2,6-dimethyltetrathiafulvalene)-(2,6-diethynylbenzene) copolymer. In Formula (10), n is an integer representing the number of repeating monomer units. The yield was 0.07 g (79%). As a result of a gel permeation chromatography (GPC) measurement, the molecular weight of this polymer 10b was 36484 in terms of polystyrene standard. A coin-type battery described in Comparative Example 2 was fabricated using the polymer 10b and was subjected to a charge/discharge test. As a result, the reduction potential of the polymer 10b was 3.7 V and 3.3 V

[Chemical Formula 10]

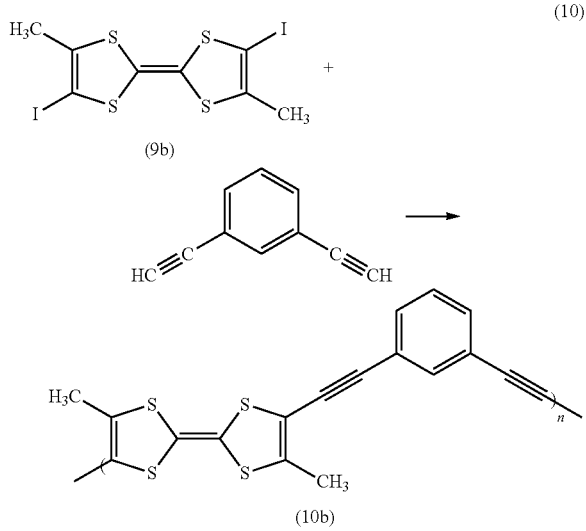

Example 1

In Example 1, a coin-type non-aqueous electrolyte secondary battery shown in FIG. 1 was produced using a positive electrode active material (first active material) capable of occluding and releasing lithium ions and an organic active material (second active material) capable of occluding and releasing anions. Vanadium pentoxide ($V_2O_5$), which is a vanadium oxide, was used as the first active material, the polymer 10b synthesized as described above was used as the second active material, and lithium metal was used as the negative electrode.

[Production of Positive Electrode] 67 mg of the polymer 10b synthesized as described above, 54 mg of $V_2O_5$ (manufactured by Aldrich), and 160 mg of acetylene black as a conductive agent were weighed, and put into a mortar and mixed until a homogeneous mixture was obtained. Furthermore, 33 mg of polytetrafluoroethylene was added as a binder and mixed in the mortar until a homogeneous mixture was obtained. The homogeneous mixture thus obtained was pressed onto a stainless steel mesh (30 mesh by Nilaco Corporation) as a current collector by a roller, vacuum-dried, and stamped into a disk shape with a diameter of 16 mm. Thus, a positive electrode was produced. The weights of the applied active materials, i.e., $V_2O_5$ and the polymer 10b, in this positive electrode were 7.5 mg and 9.2 mg, respectively.

[Production of Electricity Storage Device]

The positive electrode thus produced was used, and lithium metal (with a thickness of 0.3 mm) was used as a negative electrode. As a solvent for dissolving an electrolyte, a solvent in which ethylene carbonate (EC) and ethyl methyl carbonate (EMC) were mixed at a volume ratio of 1:3 was used. Lithium hexafluorophosphate as an electrolyte was dissolved in this solvent at a concentration of 1.25 mol/L to obtain an electrolyte solution.

This electrolyte solution was impregnated into a porous polyethylene sheet (with a thickness of 20 μm) as a separator, the positive electrode, and the negative electrode. The separator, the positive electrode, and the negative electrode were put into a coin-type battery case as configured in FIG. 1. The opening of the case was covered by a sealing plate with a gasket, and then crimp-sealed by a press machine. The coin-type non-aqueous electrolyte secondary battery of Example 1 was obtained in this way.

Comparative Example 1

In Comparative Example 1, a coin-type non-aqueous electrolyte secondary battery as shown in FIG. 1 was produced using vanadium pentoxide ($V_2O_5$) alone as an positive electrode active material capable of occluding and releasing lithium ions and lithium metal as a negative electrode.

300 mg of $V_2O_5$ (manufactured by Aldrich), and 43 mg of acetylene black as a conductive agent were weighed, and mixed in a mortar until a homogeneous mixture was obtained. Furthermore, 35 mg of polytetrafluoroethylene was added as a binder and mixed in the mortar until a homogeneous mixture was obtained. The homogeneous mixture thus obtained was pressed onto a stainless steel mesh (30 mesh by Nilaco Corporation) as a current collector by a roller, vacuum-dried, and stamped into a disk shape with a diameter of 16 mm. Thus, a positive electrode was produced. The weight of the applied active material, i.e., $V_2O_5$, in this positive electrode was 63 mg.

The coin-type non-aqueous electrolyte secondary battery of Comparative Example 1 was obtained in the same manner as in Example 1, except that this positive electrode was used.

Comparative Example 2

In Comparative Example 2, a coin-type non-aqueous electrolyte secondary battery as shown in FIG. 1 was produced using the polymer 10b synthesized as described above alone and lithium metal as a negative electrode.

35 mg of the polymer 10b synthesized as described above and 85 mg of acetylene black as a conductive agent were weighed, and mixed in a mortar until a homogeneous mixture was obtained. Furthermore, 19 mg of polytetrafluoroethylene was added as a binder and mixed in the mortar until a homogeneous mixture was obtained. The homogeneous mixture thus obtained was pressed onto a stainless steel mesh (30 mesh by Nilaco Corporation) as a current collector by a roller, vacuum-dried, and stamped into a disk shape with a diameter of 16 mm. Thus, a positive electrode was produced. The weight of the applied active material, i.e., the polymer 10b, in this positive electrode was 6.8 mg.

The coin-type non-aqueous electrolyte secondary battery of Comparative Example 2 was obtained in the same manner as in Example 1, except that this positive electrode was used.

[Evaluation of Charge/Discharge Characteristics of Batteries]

The charge/discharge capacity, output power (pulse discharge characteristic) and input power (pulse charge characteristic) of each of the coin-type non-aqueous electrolyte secondary batteries obtained in Example 1, Comparative Example 1, and Comparative Example 2 were evaluated. All these tests were performed on the battery in a temperature-controlled environment at 25° C.

For the evaluation of the charge/discharge capacity, a charge/discharge test was repeated three times to confirm stable charge/discharge cycle performance, and then the discharge capacity in the third cycle was measured. The discharge capacity thus obtained was divided by the total weight of the active materials in the positive electrode to obtain a value. This charge/discharge test was carried out by charging/discharging the battery at a constant current value equivalent to the 10-hour rate current (i.e., 0.1 CmA). For the voltage range, the upper limit of the charge voltage was 4.0 V, and the lower limit of the discharge voltage was 2.5 V. After charging, a 30-minute pause was inserted, and then discharge was started. For the evaluation of the output power (pulse discharge characteristic), each battery was first charged at a constant current value equivalent to the 10-hour rate current (i.e., 0.1 CmA). After a 30-minute pause was inserted, the battery was discharged, and the maximum current value, at which 5-second discharge could be observed, was measured. The upper limit of the charge voltage was 3.7 V for charging, and the lower limit of the discharge voltage was 2.5 V for discharging.

For the evaluation of the output power (pulse discharge characteristic), the charge/discharge capacity as mentioned above was first evaluated. Each battery was discharged at a constant current value equivalent to the 10-hour rate current (i.e., 0.1 CmA) and at a battery voltage of not less than 3.4 V as the lower limit. Thus, the battery was in the discharged state. After a 30-minute pause was inserted, the battery was charged, and the maximum current value, at which 5-second discharge could be observed, was measured. The upper limit of the charge voltage for charging was 3.7 V.

Table 1 collectively shows the results of the charge/discharge capacity evaluation, the output power evaluation, and the input power evaluation.

TABLE 1

|  | Evaluation of charge/discharge capacity [mAh/g] | Evaluation of output power [mA] | Evaluation of input power [mA] |
| --- | --- | --- | --- |
| Example 1 | 128 | 87 | 48 |
| Comparative Example 1 | 111 | 18 | 9 |
| Comparative Example 2 | 122 | 50 | 30 |

As shown in Table 1, the battery (of Comparative Example 1) using $V_2O_5$ alone as an active material for the positive electrode exhibited the worst output characteristics. The battery (of Comparative Example 2) using the polymer 10b alone as an active material for the positive electrode exhibited better output characteristics than those of Comparative Example 1. Probably, this is because the polymer 10b reacts faster than $V_2O_5$.

In contrast, the battery of the present invention (Example 1) using both $V_2O_5$ and the polymer 10b as active materials for the positive electrode exhibited not only a high capacity but also better output characteristics than those of the batteries of Comparative Examples 1 and 2. Probably, the excellent output characteristics are attributed to the combined use of $V_2O_5$ and the polymer 10b as active materials for the positive electrode, in which both lithium ions and anions serving as reactant ions allowed the reactions of these active materials to proceed smoothly. In addition, it can be confirmed from the high capacity that both of these electrode active materials were involved in charge and discharge as designed.

Furthermore, as shown in Table 1, the battery (of Comparative Example 1) using $V_2O_5$ alone as an active material for the positive electrode exhibited the worst input characteristics, too, like the output characteristics. The battery (of Comparative Example 2) using the polymer 10b alone as an active material for the positive electrode exhibited better input characteristics than those of Comparative Example 1. Probably, this is because the polymer 10b reacts faster than $V_2O_5$.

In contrast, the battery of the present invention (Example 1) using both $V_2O_5$ and the polymer 10b as active materials for the positive electrode exhibited not only a high capacity but also better input characteristics than those of the batteries of Comparative Examples 1 and 2. Probably, the excellent input characteristics are attributed to the combined use of $V_2O_5$ and the polymer 10b as active materials for the positive electrode, in which both lithium ions and anions serving as reactant ions allowed the reactions, i.e., not only discharge reactions but also charge reactions, of these active materials to proceed smoothly.

The coin-type battery of Comparative Example 1 was produced and the charge/discharge test was carried out to measure the reduction potentials of $V_2O_5$. As a result, the reduction potentials were 3.2 V and 3.4 V with respect to lithium. The coin-type battery of Comparative Example 2 was produced and the charge/discharge test was carried out to measure the reduction potentials of the polymer 10b. As a result, the reduction potentials were 3.7 V and 3.3 V with respect to lithium. This means that the coin-type battery of Example 1 had an overlapping potential region including the range of 3.3 V to 3.4 V. One reduction potential (3.4 V) of the first active material ($V_2O_5$) was higher than one reduction potential (3.3 V) of the second active material (polymer 10b). The second active material had a first reduction potential (3.7 V) that is higher than one reduction potential (3.4 V) of the first active material and a second reduction potential (3.3 V) that is lower than 3.4 V.

INDUSTRIAL APPLICABILITY

The non-aqueous electrolyte secondary battery of the present invention has a high output power, a high capacity, and excellent cycle characteristics. In particular, since the non-aqueous electrolyte secondary battery of the present invention has an excellent pulse discharge characteristic, it can suitably be used for various portable devices, transport machines, uninterruptible power supplies, etc. requiring instantaneous high currents.

The invention claimed is:

1. A non-aqueous electrolyte secondary battery comprising:
    a positive electrode including a first active material capable of occluding and releasing a lithium ion and a second active material capable of occluding and releasing an anion;
    a negative electrode including a negative electrode active material capable of occluding and releasing a lithium ion; and
    an electrolyte containing a salt of a lithium ion and the anion,
    wherein the second active material is a polymer having a tetrachalcogenofulvalene skeleton in a repeating unit.

2. The non-aqueous electrolyte secondary battery according to claim 1, wherein the non-aqueous electrolyte secondary battery has an overlapping potential region where a potential range in which the first active material can occlude and release the lithium ion and a potential range in which the second active material can occlude and release the anion overlap each other.

3. The non-aqueous electrolyte secondary battery according to claim 1, wherein at least one reduction potential of the first active material is higher than at least one reduction potential of the second active material.

4. The non-aqueous electrolyte secondary battery according to claim 1, wherein the first active material has a higher reduction potential than a highest reduction potential of the second active material.

5. The non-aqueous electrolyte secondary battery according to claim 1, wherein the second active material has a first reduction potential that is higher than one reduction potential of the first active material and a second reduction potential that is lower than the one reduction potential of the first active material.

6. The non-aqueous electrolyte secondary battery according to claim 2, wherein
   one reduction potential of the first active material and one reduction potential of the second active material exist in the overlapping potential region, and
   the one reduction potential of the first active material is higher than the one reduction potential of the second active material.

7. The non-aqueous electrolyte secondary battery according to claim 1, wherein the first active material is a transition metal oxide including lithium.

8. The non-aqueous electrolyte secondary battery according to claim 1, wherein the first active material includes $V_2O_5$.

9. The non-aqueous electrolyte secondary battery according to claim 7, wherein the transition metal oxide is $LiFePO_4$.

10. The non-aqueous electrolyte secondary battery according to claim 1, wherein the polymer has the tetrachalcogenofulvalene skeleton in its main chain.

11. The non-aqueous electrolyte secondary battery according to claim 1, wherein the polymer has the tetrachalcogenofulvalene skeleton in its side chain.

12. The non-aqueous electrolyte secondary battery according to claim 1, wherein
   the positive electrode includes: a positive electrode current collector; and a positive electrode active material layer that is formed on the positive electrode current collector and includes the first active material and the second active material, and
   the second active material is uniformly distributed in the positive electrode active material layer.

13. The non-aqueous electrolyte secondary battery according to claim 1, wherein the polymer does not have a hydrophilic group.

* * * * *